(12) United States Patent
Lande

(10) Patent No.: US 7,593,492 B1
(45) Date of Patent: Sep. 22, 2009

(54) COMBINATIONAL HYBRID TURBO-MUD

(75) Inventor: Mark Lande, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 623 days.

(21) Appl. No.: 11/532,125

(22) Filed: Sep. 15, 2006

(51) Int. Cl.
H03D 1/04 (2006.01)
(52) U.S. Cl. .................. 375/346; 375/148; 370/342
(58) Field of Classification Search ........... 375/144, 375/148, 341, 346; 370/342, 441
See application file for complete search history.

(56) References Cited

U.S. PATENT DOCUMENTS

| | | | |
|---|---|---|---|
| 5,506,861 | A | 4/1996 | Bottomley |
| 5,563,897 | A | 10/1996 | Pyndiah et al. |
| 6,122,269 | A | 9/2000 | Wales |
| 6,151,370 | A | 11/2000 | Wei |
| 6,167,022 | A | 12/2000 | Ishida et al. |
| 6,182,261 | B1 | 1/2001 | Haller et al. |
| 6,704,376 | B2 | 3/2004 | Mills et al. |
| 6,898,248 | B1 | 5/2005 | Elgamal et al. |
| 7,110,439 | B2 * | 9/2006 | MacLeod ............ 375/147 |
| 7,133,433 | B2 * | 11/2006 | Jalloul et al. ........... 375/141 |
| 7,340,281 | B2 * | 3/2008 | Zeira et al. ............ 455/562.1 |
| 2003/0187928 | A1 | 10/2003 | MacLeod et al. |
| 2004/0022336 | A1 | 2/2004 | Yu et al. |
| 2005/0018793 | A1 | 1/2005 | Learned |

OTHER PUBLICATIONS

Pottie, Gregory J et al., "A Comparison of Reduced Complexity Decoding Algorithms for Trellis Codes", IEEE on Selected Areas in Communications, Dec. 1989, pp. 1369-1380, vol. 7, No. 9.

Berrou, Claude et al., "Near Optimum Error Correcting Coding and Decoding: Turbo-Codes", IEEE Trans. on Communications, Oct. 1996, pp. 1261-1271, vol. 44, No. 10.

Berrou, Claude et al., "Near Shannon Limit Error-Correcting Coding and Decoding: Turbo Codes(1)", IEEE, 1993, pp. 1064-1070.

Duanyi, Wang et al., "Low-Complexity MAP Decoding for Turbo Codes", Vehicular Technology Conference, 2000, pp. 1035-1039, Princeton University, Princeton NJ.

Herzog, Rupert et al., "Iterative Decoding and Despreading Improves CDMA-Systems Using M-ary Orthogonal Modulation and FEC", IEEE, 1997, pp. 909-913.

Das, Suman et al., "Computationally Efficient Iterative Multiuser Detection and Decoding", Asilormar, 1998, pp. 631-634, Department of Electrical and Computer Engineering, Rice Unviersity, Houston Texas.

Wang, Xiaodong et al., "Iterative (Turbo) Soft Interference Cancellation and Decoding for Coded CDMA", IEEE Trans. on Communications, Jul. 1999, pp. 1046-1061, vol. 47, No. 7.

Poor, Vincent, "Turbo Multiuser Detection: An Overview", Department of Electrical Engineering, IEEE 6th International Symposium on Spread-Spectrum Tech. & Appliances, Sep. 2000, pp. 583-587, Princeton University, Princeton NJ.

(Continued)

Primary Examiner—Kevin Y Kim
(74) Attorney, Agent, or Firm—Vern Maine & Associates

(57) ABSTRACT

A high quality real-time Turbo-Mud processing system that chooses between a high complexity multi-user detectors that results in better estimates of the bit streams and computationally low linear-based-MUD/Turbo-MUD at each MUD window in each Turbo Iteration. In one embodiment this technique optimizes both the BER and the computational complexity of the receiver by using low complexity MUDs to reduce the number of symbols that the high complexity MUDs need to process. The present invention also provides an efficient means of estimating symbols transmitted in a multi-user environment in overloaded or super-saturated conditions.

20 Claims, 7 Drawing Sheets

OTHER PUBLICATIONS

Alexander, Paul et al., "Iterative Multiuser Interference Reduction: Turbo CDMA", IEEE Transactions on Communications, Jul. 1999, pp. 1008-1014, vol. 47, No. 7.

Hagenauer, Joachim et al., "A Viterbi Algorithm with Soft-Detection Outputs and its Applications", IEEE, 1989, pp. 1680-1686.

Robertson, Patrick, "A Comparison of Optimal and Sub-Optimal MAP Decoding Algorithms Operating in the Log Domain", IEEE, 1995, pp. 1009-1013.

Verdu, S., "Minimum Probability of Error for Asynchronous Gaussian Multiple-Access Channels", IEEE Transactions on Information Theory, Jan. 1986, pp. 85-96, vol. IT-32, No. 1.

Lupas, Ruxandra et al., "Linear Multiuser Detectors for Synchronous Code-Division Multiple-Access Channels", IEEE Transactions on Information Theory, Jan. 1989, pp. 123-136, vol. 35, No. 1.

Wei, Lei et al., "Synchronous DS-SSMA System with Improved Decorrelating Decision-Feedback Multiuser Detection", IEEE Transactions on Vehicular Technology, Aug. 1994, pp. 767-772, vol. 43, No. 3.

Varanasi, Mahesh K. et al., "Near-Optimum Detection in Synchronous Code-Division Multiple-Access Systems", IEEE Transactions on Communications, May 1991, pp. 725-736, vol. 39, No. 5.

Duel-Hallen, Alexandra, "Decorrelating Decision-Feedback Multiuser Detector for Synchronous Code-Division Multiple-Access Channel", IEEE Transactions on Communications, Feb. 1993, pp. 285-290, vol. 41, No. 2.

Lupas, Ruxandra et al., "Near-Far Resistance of Multiuser Detectors in Asynchronous Channels", IEEE Transactions on Communications, Apr. 1990, pp. 496-508, vol. 38, No. 4.

* cited by examiner

COMBINATIONAL HYBRID TURBO-MUD

STATEMENT OF GOVERNMENT INTEREST

Portions of the present invention have been made in conjunction with Government funding under DARPA Contract No. HR0011-05-C-0064 and there may be certain rights to the Government.

CROSS REFERENCE TO RELATED APPLICATIONS

This application is related to U.S. application Ser. No. 10/626,146, filed Jul. 24, 2003, titled "Hybrid Turbo-MUD for Overloaded Multiple Access Systems" which is herein incorporated in its entirety by reference for all purposes.

FIELD OF THE INVENTION

This present invention relates to advanced receiver techniques for processing signals, and more particularly to multi-user detection (MUD) for processing multiple users' signals that interfere with one another.

BACKGROUND OF THE INVENTION

Increased usage and higher content demands have rapidly changed the wireless landscape. The data demands require greater efficiency and the ability to process overloaded environments and extracting more information signals within a limited bandwidth. The multiple-access receiver processing procedures allow for multiple users to access the same communications medium to transmit or receive information. In addition to the problems associated with multiple users in a given bandwidth, an additional problem is the inability to process the data in the receivers in real time. Advanced receiver processing techniques cover several areas, namely interference suppression (also called Multi-User Detection or MUD), multipath combining and space-time processing, equalization, and channel estimation. These various techniques can be mixed and matched depending upon the circumstances. Proper signal processing of transmitter and receiver yield a far greater potential than current systems.

For example, a base station that processes a number of cellular devices has to receive and transmit data within a certain frequency range. The ability to extract the correct data from a given user is a difficult task when the effects of interference and multipaths are considered. The problem is further complicated when the number of users exceeds the number of dimensions (e.g. time slots, frequency slots, polarizations, etc), resulting in an overloaded condition.

In the past, multiple access (MA) communication systems generally utilized Frequency Division Multiple Access (FDMA) and Time Division Multiple Access (TDMA) methods to achieve channel access. FDMA refers to the parsing up of an allocated band for a communication system wherein a single user's signal transmission power is concentrated into a single narrower radio frequency band. Interference from adjacent channels is limited by the use of band pass filters for each channel being assigned a different frequency system, total capacity is limited by the available frequency slots and by physical limitations imposed by frequency reuse.

In TDMA systems, a channel consists of a time slot or frame in a periodic train of time intervals over the same frequency, with a given signal's energy confined to one of these time slots. Adjacent channel interference is limited by the use of a time gate or other synchronization element that only passes signal energy received at the proper time. The system capacity is limited by the available time slots (within a given frequency band) as well as by physical limitations imposed by frequency reuse, as each channel is assigned a different time slot within a particular frequency band.

One of the goals of FDMA and TDMA systems is to try and prevent two potentially interfering signals from occupying the same frequency at the same time, namely co-channel interference. In contrast, Code Division Multiple Access (CDMA) techniques allow signals to overlap in both time and frequency. CDMA signals share the same frequency spectrum at the same time, hence, the CDMA signals appear to overlap one another. The scrambled signal format of CDMA reduces cross talk between interfering transmitters.

In a CDMA system, each signal is transmitted using spread spectrum techniques. The transmitted informational data stream is impressed upon a much higher rate data stream termed a signature sequence. The bit stream of the signature sequence data is typically binary, and can be generated using a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

In operation, a stream of spread information signature signals are modulated by weights corresponding to the information that is to be transmitted. Some modulation examples include binary phase shift keying (BPSK) and quadrature phase shift keying (QPSK). If several transmitters modulate their data onto the signature waveform and modulate again with the carrier tone, a radio frequency (RF) signal comprised of a continuous stream of information modulated signature pulses will be present at the receiver, one corresponding to each transmitter. The transmitted signals are jointly received as a composite signal at the receiver. Each of the spread signals overlaps all of the other spread signals in time and frequency. Moreover, environmental noise as well as receiver electronic noise is also present in the measured received signal. A conventional CDMA receiver correlates the composite noisy signal with one of the unique signature sequences, and the corresponding information signal is isolated and despread while the other signals appear as only small additions to the noise floor.

A signature sequence is often used to represent one bit of information. Receiving the transmitted sequence or its complement indicates whether the information bit is a +1 or −1, sometimes denoted "0" or "1". The signature sequence usually comprises N pulses, and each pulse is called a "chip". The entire N-chip sequence, or its complement, depending on the information bit to be conveyed, is referred to as a transmitted symbol.

The receiver correlates the received signal with the complex conjugate of the known signature sequence to produce a correlation value. When a 'large' positive correlation results, a "0" is detected, and when a 'large' negative correlation results, a "1" is detected.

It should be understood that the information bits could also be coded bits (also referred to as channel bits or symbols), where the code is a block or convolutional code. Also, the signature sequence can be much longer than a single transmitted symbol, in which case a subsequence of the signature sequence is used to spread the information bit.

The present systems typically do not properly account for the real world mobile communication signals and the signal degradation such as interference and multipath problems. The system use assumptions that all other interferers and multi-paths are additive white Gaussian noise, which is not accurate for co-channel interference and multipaths.

Multipath dispersion occurs when a signal proceeds to the receiver along not one but many paths so that the receiver encounters echoes having different and randomly varying delays and amplitudes. The receiver receives a composite signal of multiple versions of the transmitted symbol that have propagated along different paths, called rays, having different relative time. Each distinguishable ray has a certain relative time of arrival, a certain amplitude and phase, and as a result, the correlator outputs several smaller spikes. RAKE receivers are well known and attempt to 'rake' together all the contributions to detect the transmitted symbol and recover the information bit.

Conventional RAKE receivers provide satisfactory performance for operation in the presence of multipath under ideal conditions however the signature sequence must be uncorrelated with time shifted versions of itself as well as various shifted versions of the signature sequences of the other CDMA signals. Co-channel interference refers to signals received from other users either directly or reflected. If one received signal corresponding to the signature sequence of interest has a non-negligible cross correlation with the received signal originating from another transmitter (a co-channel interferer), then the value measured at the receiver, e.g. the correlation value for the signal of interest, is corrupted. In other words, the correlation computed at the receiver that would be used to decode a particular signal of interest is overwhelmed by an interfering signal; this is referred to as the near-far problem. The interference caused by an echo of one transmitted symbol overlapping with the next transmitted symbol might also be non-negligible. If this is the case, the transmitted symbols interfere with past and future transmitted symbols. This is commonly referred to as intersymbol interference (ISI). In actuality, performance is degraded both by co-channel interference and ISI.

There has been much research to address signal interference with known multipath time dispersion. This is termed joint demodulation with no multipath and is further described in S. Verdu, "Minimum Probability of Error For Asynchronous Gaussian Multiple-Access Channels," IEEE Trans. Info. Theory, Vol. IT-32, pp. 85-96, R. Lupas and S. Verdu, "Linear multiuser detectors for synchronous code-division multiple-access channels," IEEE Trans. Inform. Theory, Vol. 35, pp. 123-136, January 1989; and R. Lupas and S. Verdu, "Near-far resistance of multiuser detectors in asynchronous channels," IEEE Trans. Commun., Vol. 38, pp. 496-508, April 1990.

There are a host of approaches for jointly demodulating any set of interfering digitally modulated signals, including multiple digitally modulated signals. Maximum Likelihood Sequence Estimation determines the most likely set of transmitted information bits for a plurality of digital signals without multipath time dispersion. The maximum likelihood joint demodulator is capable, in theory, of accommodating the largest number of interfering signals, but has a prohibitive computational complexity that makes it unrealizable in practice. The decorrelation receiver is another, less computationally complex receiver processing approach that zeroes out or decorrelates the different signals so that they no longer interfere with one another. The decorrelator as well as virtually every other lower complexity joint demodulator, is not capable of operation when the number of signals is over a set threshold which falls significantly short of the theoretical maximum.

In a real world multi-user system, there are a number of independent users simultaneously transmitting signals. These transmissions have the real-time problems of multi-path and co-channel interference, fading, and dispersion that affect the received signals. As described in the prior art, multiple user systems communicate on the same frequency and at the same time by utilizing parameter and channel estimates that are processed by a multi-user detector. The output of the optimal multi-user detector operating within the multiuser capacity limits of the channel is an accurate estimation as to the individual bits for an individual user.

Moreover, in an article by Paul D. Alexander, Mark C. Reed, John A. Asenstorfer and Christian B. Schlagel in IEEE Transactions on Communications, vol. 47, number 7, July 1999, entitled "Iterative Multi-User Interference Reduction: Turbo CDMA," a system is described in which multiple users can transmit coded information on the same frequency at the same time, with the multi-user detection system separating the scrambled result into interference-free voice or data streams.

Low complexity multiuser detector have been contemplated that use linear multiuser detectors to achieve optimal near-far resistance. (Near-Far Resistance of Multiuser Detectors for Coherent Multiuser Communications, R. Lupas, S. Verdu, IEEE Trans. Commun. Vol. 38, no. 4, pp 495-508, April 1990). While providing certain advantages, the performance has not been demonstrably improved. Varanasi and Aazhang proposed a multistage technique as described in the article Near-Optimum Detection in Synchronous Code-Division Multiple Access Systems, IEEE Trans. Commun., Vol. 39, No. 5, May 1991.

Decorrelating decision feedback detectors (DDFD) have been described by A. Duel-Hallen in Decorrelating Decision-Feedback Multiuser Detector for Synchronous Code-division Multiple Access Channel, IEEE Trans. Commun., Vol. 41, pp 285-290, February 1993. Wei and Schlegel proposed soft-decision feedback to suppress error propagation of the DDFD in Synchronous DS-SSMA with Improved Decorrelating Decision-Feedback Multiuser Detection, IEEE Trans. Veh. Technol., Vol. 43, pp 767-772, August 1994. Tree-type maximum-likelihood sequence detectors were also proposed for multiuser systems as were breadth-first algorithms and sequential detection including using the M-algorithm tree-search scheme with a whitened matched filter (WMF).

However, one of the primary disadvantages of some of the prior implementations is the inability to accommodate overloaded conditions. The DDFD techniques are limited in that they are incapable of working in supersaturated environments. Generally, only the MMSE-based or tree based decision feedback detector can work in a supersaturated environment, however it is too aggressive with hypothesis testing to produce accurate results.

Multi-user detection (MUD) refers to the detection of data in non-orthogonal channels. MUD processing increases the number of bits available per chip or signaling dimension for systems having interference limited systems. A MUD receiver jointly demodulates co-channel interfering digital signals.

Optimal MUD based on the maximum likelihood sequence estimator operates by comparing the received signal with the entire number of possibilities that could have resulted, one for each bit or symbol epoch. The number of possible measured levels for the received signal is exponentially related to the number of users and the duration of the ISI. Hence, the optimal processing is a computationally complex and it is not possible to accomplish in a real-time environment. Thus for those multi-user detectors that examine the entire space, real-time operation is often elusive.

In general, optimal MUD units function by examining a number of possibilities for each bit. However, for multi-user detectors that examine a larger capacity of signal, the computations are complex and time-consuming, thus making real-time operation impossible. Numerous attempts at reliable pruning of the optimal MUD decision process or the use of linear approximation to the replace the optimal MUD have still not produced a workable solution for the real world environment.

There are various multiuser detectors in the prior art, including optimal or maximum likelihood MUD, maximum likelihood sequence estimator for multiple interfering users, successive interference cancellation, TurboMUD or iterative MUD, and various linear algebra based multi-user detectors such as all of those detailed in the well-known text "Multiuser Detection" by Sergio Verdu. In basic terms, turbodecoding refers to breaking a large processing process into smaller pieces and performing iterative processing on the smaller pieces until the larger processing is completed. This basic principle was applied to the MUD.

There are several suboptimal multiuser detectors that are less computationally complex and known in the art. One example of suboptimal detectors, called linear detectors, includes decorrelators, minimum mean square error or MMSE detectors, and zero-forcing block linear equalizers. But, certain linear based MUD (non-iterative) and successive interference cancellation fails for cases of overloaded multiple access systems. One example of overloading is where the number of simultaneous users is doubled or tripled relative to existing state of the art. Even for underloaded multiple access systems, the performance of non-iterative MUD and successive interference cancellation degrades significantly as the number of users increases, while the computational complexity of the optimal MUD increases significantly as the number of users increases. The computing problems are so extreme that even the most expensive hardware unbound by size and weight can not keep up with this overwhelming complex processing requirement of optimal MUD. Moreover, an unreasonable delay would be required to decode each bit or symbol rendering such a system useless in practice.

Reduced complexity approaches based on tree-pruning help to some extent to eliminate the improper bit combination from consideration where, ideally, such a procedure should prune out many 'bad' paths in the decision tree but maintain the proper path. Thus, the entire tree does not need to be traversed to make the final decision.

The M-algorithm is a pruning process that limits the number of hypotheses extended to each stage to a fixed tree width and prunes based on ranking metrics for all hypotheses and retaining only the M most likely hypotheses. The T-algorithm prunes hypotheses by comparing the metrics representing all active hypotheses to a threshold based on the metric corresponding to the most-likely candidate. Performance of M-algorithm based MUD degrades as the parameter M is decreased, but M governs the number of computations required. Similar effects are seen for other tree-pruning based MUD (T-algorithm, etc). To combat improper pruning, basic tree-pruning must ensure that M is "large enough", and therefore still encounters increased complexity for acceptable performance levels when the number of interfering signals and/or ISI lengths are moderate to large.

As an illustration of the M-algorithm as a tree-pruning algorithm, consider a tree made up of nodes and branches. Each branch has a weight or metric, and a complete path is sequences of nodes connected by branches between the root of the tree and its branches. When applied as a short cut to the optimal MUD, each branch weight is a function of the signature signal of a certain transmitter, the possible bit or symbol value associated with that transmitter at that point in time, and the actual received signal which includes all the signals from all the interfering transmissions. The weight of each path is the sum of the branch metrics in a complete path. The goal of a tree searching algorithm is to try to find the complete path through a tree with the lowest metric. With the present invention the metrics of multiple complete paths are not calculated. Rather, the metrics of individual branches in a tree are calculated in the process of locating one complete path through the tree and thereby defines one unknown characteristic of each of the co-channel, interfering signals needed to decode the signals.

A MUD algorithm within the TurboMUD system determines discrete estimates of the transmitted channel symbols, with the estimates then provided to a bank of single-user decoders (one decoder for each user) to recover the input bit streams of all transmitted signals. Two general types of multi-user detectors within the TurboMUD system are possible, namely those that provide hard outputs, which are discrete values, and those that provide soft outputs, which indicate both the discrete estimate and the probability that the estimate is correct.

However, single-user decoders operating on hard values, or discrete integers, have unacceptable error rates when there is a large amount of interference or noise in the received signal. The reason is that discrete integers do not provide adequate confidence values on which the single-user decoder can operate. These decoders operate better on so-called soft inputs in which confidence values can range from −1 to 1, such as for instance 0.75 as opposed to being either −1 or +1. To provide soft values that can then be utilized by a single-user decoder, the multi-user detector chosen for the TurboMUD can generate these soft values. The invention described below will work with soft output or a hard output MUDs, or a combination of the two.

In general, soft or hard output versions of the optimum maximum likelihood multi-user detector (Verdu, Multiuser Detection, Cambridge University Press, 1998) or an M algorithm (as described, for instance, in Schlegel, Trellis Coding, IEEE Press, 1997) with a moderate to high value of M causes the Turbo MUD to require too many computations to keep up with real time transmissions. Using a fast, but inferior, multiuser detection scheme such as a linear-based detector or those detailed in the text "Multiuser Detection" by Sergio Verdu causes poor quality output when there are many or strongly correlated interferers or users.

Moreover, when dealing with hand-held communications units such as wireless handsets, the amount of processing within the device is limited, directly limiting the amount of computational complexity that is allowed. In order to provide real-time performance both at a cell site and the handset, it therefore becomes important to be able to reduce the amount of computational complexity and processing time so as to achieve real-time performance.

The growing demand for processing more data and in a smaller bandwith raises the need to optimize performance. What is needed is an efficient signal processing system and processing to improve the quality and spectral efficiency of wireless communications and better techniques for sharing the limited bandwidth among different high capacity users

SUMMARY OF THE INVENTION

The invention is devised in the light of the problems of the prior references described herein, and a general object is to provide a more efficient MUD processing that still provides a satisfactory bit error rate (BER).

One embodiment of the invention is a hybrid Multi-User Detector System for processing received signals, having a parameter estimator coupled to the received signals providing received data information. There is a multi-user detector decision unit coupled to the parameter estimator and the received signals with at least two multi-user detectors coupled to the parameter estimator and the multi-user detector decision unit. The multi-user detector decision unit uses decision criteria to determine a selected multi-user detector, and the selected multi-user detector outputs a plurality of information streams, one stream corresponding to each of the received signals. There are a bank of decoders, such as low complexity decoders and high complexity decoders, coupled to the plurality of information streams, wherein the decoders output a plurality of improved information streams.

In a turboMUD embodiment, the plurality of improved information streams are fed back to the multi-user detector decision unit until a final condition is reached and the bank of decoders output a final data stream.

According to one embodiment, the design criteria is based upon at least one threshold, where the threshold is selected from at least one of the group consisting of: number of symbols, correlation matrix between users, expected bit error rate, eigendecomposition of correlation matrix, signal to interference plus noise ratio, and expected SINR. In addition, the threshold can be dynamically changeable such that at each iteration the threshold can be changed. The threshold can also be changed depending upon which multi-user is selected. There can also be multiple thresholds for the various multi-user detectors.

An additional embodiment includes wherein the at least two multiuser detectors are selected from the group consisting of: M-algorithm, T-algorithm, FANO, reduced state Viterbi, Maximum Likelihood, matched filter, mean squared error (MMSE), decorrelator, and combinations thereof.

A further feature includes an interleaver unit and a deinterleaver unit coupled between the bank of decoders and the multi-user detectors. There can also be a filter unit coupled to the received signals, wherein the filter unit is coupled to the multi-user detector decision unit. In addition, there can be a hard decision unit coupled to the bank of decoders and producing the final data stream. In one variation the final condition is determined by one of a fixed number of iterations and an allowable performance level.

One embodiment of the invention is a hybrid receiver for processing a plurality of received signals, the receiver comprising a parameter estimation unit coupled to the received signals, wherein the parameter estimation unit extracts received signal information. There is a multi-user detector decision unit coupled to the parameter estimator and the received signals. A low complexity multi-user detector is switchably coupled by the multi-user detector decision unit, wherein the low complexity multi-user detector outputs a plurality of low complexity processed information streams. A high complexity multi-user detector is switchably coupled by the multi-user detector decision unit, wherein the high complexity multi-user detector outputs a plurality of high complexity processed information streams. A bank of decoders is coupled to the plurality of low complexity processed information streams and the plurality of high complexity processed information streams, wherein the decoders output a plurality of refined information streams. In one embodiment the receiver uses the high complexity multi-user detector after first processing with the low complexity multi-user detector.

A turboMUD embodiment wherein said plurality of refined information streams are fed back to said multi-user detector decision unit for iterative processing until a final condition is reached and the bank of error correction decoders output a final plurality of symbol streams.

In one embodiment the multi-user detector decision unit makes a selection determined by design criteria based upon at least one threshold selected from at least one of the group consisting of: number of symbols, correlation matrix between users, expected bit error rate, eigendecomposition of correlation matrix, signal to interference plus noise ratio, and expected SINR.

One variation includes the hybrid receiver having a front end section coupled to the received signals and to the received signal information which filters the received signals.

A further embodiment of the invention is a method for processing signals from multiple users providing raw digitized data. The method include performing parameter estimation of the raw digitized data, grabbing a window of bits from the raw digitized data, subtracting any known bits from the window of bits, selecting a multi-user detector, computing decision tree searching path metrics from the window of bits using the multi-user detector, incrementing to a next window of bits, repeating the steps of subtracting, selecting, computing and incrementing until there are no more windows, and outputting a set of symbol estimates.

As detailed herein, the multi-user detector is selectable from the group consisting of high complexity multi-user detectors, low complexity multi-user detectors and matched filters.

One method for determining a size of the window is by using an intersymbol interference length and a cochannel interference length.

According to one embodiment the method includes checking the symbol estimates for a threshold condition. The method includes outputting a final symbol stream for each user if passing the threshold condition, and repeating the steps of subtracting, selecting, computing and incrementing if failing the threshold condition.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

The methods and embodiments of the Hybrid Turbo-MUD disclosed herein enable implementations of advanced receiver processing providing high quality real-time processing for multiple access systems, including overloaded conditions. The embodiments herein illustrate digital processing technique applicable to many variations and applications all within the scope of the invention.

Figure 1:
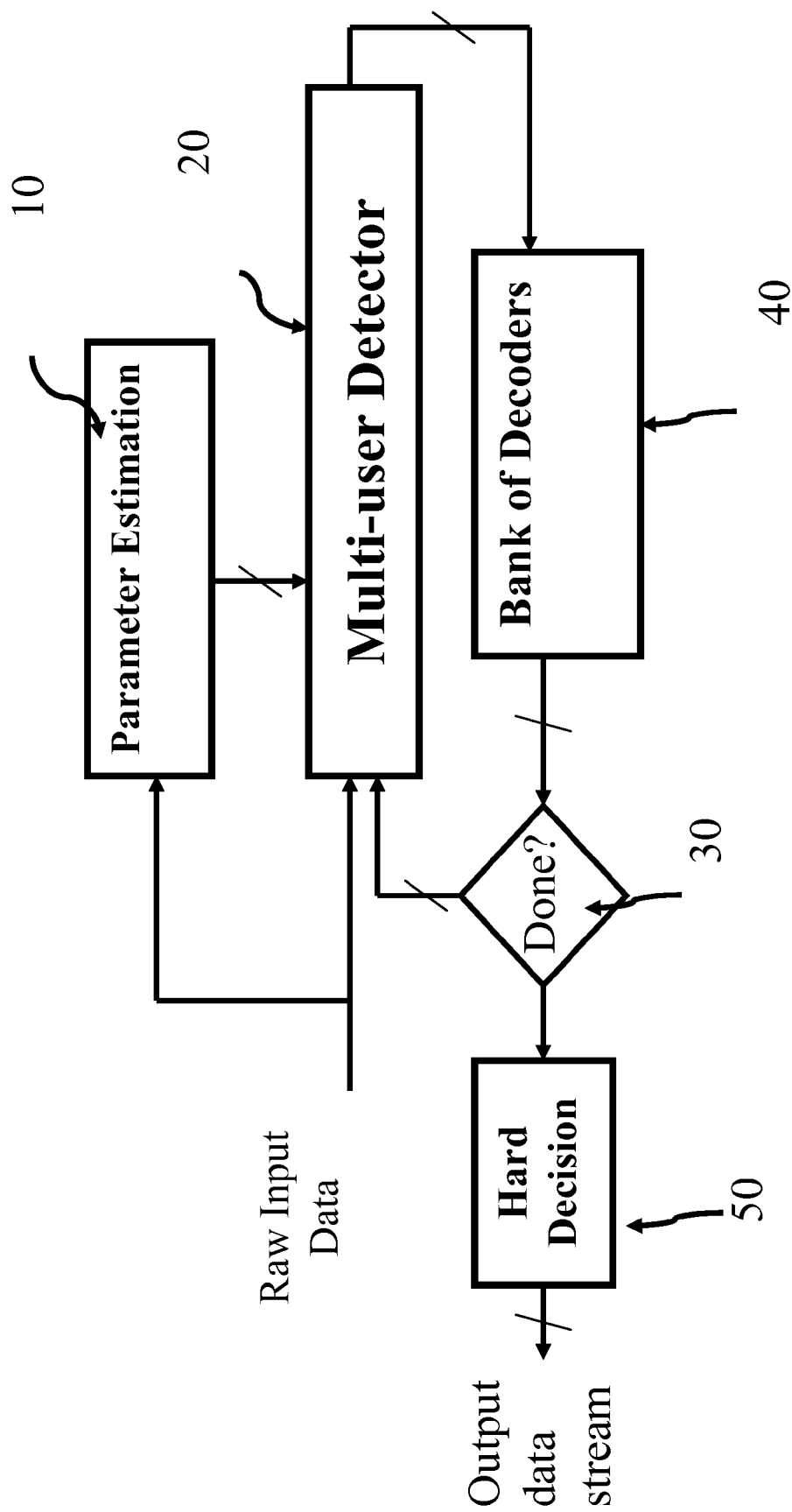
FIG. 1 shows a block diagrammatic presentation of a prior art conventional turbo MUD system illustrating the iterative processing that takes advantage of improvements in partial information gained with each iteration through the use of conditional probabilities for each decoded symbol of each user.

Referring to FIG. 1, the basic iterative MUD procedure is diagrammatically presented, and is well known from published literature such as Poor, "Turbo Multiuser Detection: An overview," IEEE $6^{th}$ Int. Symp. On Spread-Spectrum Tech. And Appli., NJIT, New Jersey, Sep. 6-8, 2000 and Alexander, Reed, Asenstorfer, and Schlegel, "Iterative Multiuser Interference Reduction Turbo CDMA," IEEE Trans. On Comms., v41, n7, July 1999. The iterative MUD is representative of the approaches used to incorporate turbo decoding methods into joint MUD/FEC (Forward Error Correction) decoding and to then reduce the complexity of the system.

It should be readily appreciated that there are two general embodiments applicable to the MUD of FIG. 1, namely an iterative embodiment and a non-iterative embodiment. The iterative embodiment or Turbo-MUD is described herein while the non iterative MUD merely runs a single cycle through the process.

The raw input data represents data after some front end processing such as downconversion, amplification, and analog-to-digital conversion, although other forms of communication have been contemplated herein. The input signal of raw non-manipulated data at the receiver is comprised of the aggregate of many signals from many different transmitters, where each signal is assigned a signature pulse for the transmission of symbols. Traditionally, these signature pulses occupy either a specific frequency, timeslot, and/or spreading code and are referred to as occupying a specific channel from a finite set of channels. In a typical scenario, the aggregate signal is collected at the receiver, down-converted and digitized.

A parameter estimation unit 10 processes the various parameters for the received raw data, and provides certain information to the MUD 20. The purpose of the parameter estimator 10, is to provide the receiver information such as estimate timing offsets, signal amplitudes, carrier phases, polarizations, channel transfer functions, carrier frequency offset or Doppler frequency offset, coding rates, identification of active channels, as well as any other information required by the MUD to carry out its processing. The parameter estimation unit is known in the art, and a detailed description is available in U.S. Pat. No. 6,947,505 entitled "System for Parameter Estimation and Tracking of Interfering Digitally Modulated Signals", which is incorporated by reference herein.

This digital input signal or raw input data is then input to the multiuser detector (MUD) 20. The MUD processing can employ the various state of the art schemes, including M-algorithm, T-algorithm, Fano-algorithm and other tree-pruned approaches known to those in the art. The MUD processing can also employ a lower complexity linear MUD with a higher expected BER. MUD systems generally require some user signal parameters in order to establish accurate decision trees for processing.

In an optimal case, the MUD detector 20 can be a full-complexity maximum aposteriori (MAP) detector. Suboptimal reduced complexity MAP-based approaches are also known in the relevant art. The data streams from the MUD 20 are passed to a bank of error correction decoders unit 40. In the non-iterative MUD, the raw data is processed by a MUD algorithm which outputs an estimate of each transmitted symbol corresponding to each active user/channel. These stream of symbols, likely corrupted by errors, are passed to the bank of error correction decoders unit 40, one for each user/channel, which is capable of outputting either a corrected symbol stream for each user (hard decision decoder) or a real number corresponding to the likelihood that each symbol is some specific value (soft decision decoder). For convenience, the terms channel bits, coded bits, and symbol are deemed equivalent and may be used interchangeably.

The MUD engine 20 within the TurboMUD can be structured for hard or soft output as well as hard or soft input processing, however in order to demonstrate a working embodiment, the soft input and soft output version is addressed herein, but it is well within the scope of the present invention to utilize any combinations of the other options.

In a Turbo-MUD system, decoding and confidence information is passed between the MUD 20 and decoder components 40. Maximum a posteriori (MAP) decoders (or approximations of MAP decoders) are well known to those in the art and are used for both the MUD and single-user (SU) decoders, so that soft output information is available if desired. The MUD 20 assumes knowledge of various parameters such as relative received timing offsets, carrier phase, frequency offsets, received amplitudes, and multipath structure for each of the interfering signals present in the received signal.

The multiuser detection unit 20 outputs a bit (or symbol) stream associated with each interfering signal present on the channel for one data block. Deinterleavers and interleavers (not shown) are optional elements coupled between the MUD 20 and the decoders 40 that are used if the transmitted signals are interleaved, such as the CDMA format. The MUD detector 20 passes soft decisions in the form of reliability, or confidence, measures to the decoders 40. The reliability measures are presented with one associated with each symbol of each user to the bank of decoders 40. If the signals were transmitted with interleaving, the reliability measures from the MUD 20 are first passed through a deinterleaver (not shown) and passed on in shuffled form to the decoder 40. Shuffling refers to processing the same values but changes the placement or presentation of the values. If interleaving was present in the transmitter, an interleaver unit performs interleaving. The time-shuffled conditional probabilities are input back to the MUD section 20. When the transmitter employs interleaving it changes the presentation of the values but not the values themselves. For example, IS-95 is the North American Cell Phone standard that employs interleaving.

In one known variation, there is a bank of error correction decoders 40 that provide soft output or restore values associated with prior probabilities. Viterbi decoders can be used, but generally outputs hard values. The single user decoders calculate conditional probabilities, one for each decoded symbol of each user, and output them as confidence values back to the MUD 20. Soft input soft output decoders, such as MAP or soft-output Viterbi algorithm (SOVA) decoders are examples known in the art. As the output of the decoders 40 is taken here for discussion purposes to be soft values, it should be understood that the hard decision is optional depending upon the application and the implementation requirements.

MAP decoding is known in the art and further described in C. Schlegel, Trellis Coding, IEEE Press, 1997; Robertson, Villebrun and Hoeher, "A Comparison of Optimal and Sub-Optimal MAP Decoding Algorithms Operation in the Log Domain," ICC95; Hagenauer, and Hoeher, "A Viterbi Algorithm with Soft-Decision Outputs and its Applications," Globecom 89; Pottie and Taylor, "A Comparison of Reduced complexity Decoding Algorithms for Trellis Codes," J Sel. Areas in Comm December 1989. The iterative turbo principle, on which Turbo MUD is based, is described by Berrou, Glavieux, and Thitimajshima, "Near Shannon Limit Error-Correcting Coding and Decoding: Turbo-Codes (1)," ICC 93; Berrou and Glavieux, "Near Optimum Error Correcting Coding and Decoding: Turbo-Codes", Trans on Comm, October 1996; and Wang and Kobayashi, "Low-Complexity MAP Decoding for Turbo Codes", Vehicular Technology Conference 2000]. Turbo MUD approaches are described in, for example, Alexander, Reed, Asenstorfer, and Schlegel, "Iterative Multiuser Interference Reduction Turbo CDMA," Trans on Comm, July 1999; Poor, "Turbo Multiuser Detection: An Overview," ISSSTA 2000; and Wang and Poor, "Iterative (Turbo) Soft Interference Cancellation and Decoding for Coded CDMA", Trans on Comm, July 1999.

For TurboMUD, soft outputs for each bit of each user from the bank of decoders 40 are fed back to the MUD 20 for each iteration. The multiuser detector 20 takes these soft inputs along with the original raw input signal to calculate an improved, less corrupted bit stream for each user. This iterative process continues until the desired quality is reached or a fixed number is reached 30. At that point, estimates of the data sequences for all active users are output. Operation then commences for the next block of data, repeating the process described above.

The number of iterations for processing between the MUD 20 and the decoders 40 can be set to a fixed counter or by checking if there were significant changes to the data from the last iteration. Once the data is no longer being altered or reaches a certain iteration counter limit, the data from the decoder 40 can be output as final estimates of what the user sent. A fixed number of iterations can be stored as the stopping point and used and processed by the decision block 30. Alternatively, the information between the MUD 20 and the decoders 40 repeats in subsequent iterations until an asymptote is reached or the desired performance level is attained. A buffer can store the previous values and compare them to the latter processed values during the iterative process.

When processing is completed 30, the soft output of the bank of error decoders 40 is passed to a hard decision unit 50 which outputs the final stream of decisions or output data stream for each interfering user for the current data block. The process is repeated for all subsequent data blocks. As described herein, this prior art TurboMUD suffers from limitations with respect to real-time processing of data in a multi-user environment due to the complexity of the MUD processing. The optimal MUD (an exhaustive search of all possible received signals given the set of known parameters and known signature pulses) must check an inordinate number of possibilities. A good alternative to the exhaustive search in the pruned tree search such as the M-algorithm, T-algorithm, or Fano sequential decoder. The problem with these, however, is that when the number of interfering users is very large, as is often the case in an overloaded environment, the computational complexity required to achieve any reasonably good bit error rate does not allow for real time operation. In other words, the time it would take to do the processing with computing resources does not allow the decoded symbols to be output at the bit rate the user's are transmitting. This causes the processor to fall farther and farther behind the transmitted information streams. There is another option for a truly low complexity MUD, however, there are associated problems with using a truly low complexity suboptimal MUD for the MUD engine. Specifically, a low complexity MUD such as a minimum mean squared error (MMSE) MUD does a very poor job decoding all the user's symbols when the interference levels or the correlations between the users are very high, as is the case in an overloaded system.

As described, there are several types of MUD that have been developed to solve the overloaded user communications scenario. While the maximum likelihood (ML) detector is optimal if the coding in the signals is not used and each user is detected symbol by symbol, running an exhaustive ML search is not computationally practical or feasible. Linear MUD detectors have been developed to setup linear decision regions which, unlike the matched filter, take all the interfering users into account when setting up the decision regions. Two examples are the decorrelator detector and the MMSE detector.

$$Decorrelator: \hat{b} = (S^H S)^{-1} y$$

$$MMSE: \hat{b} = \left(S^H S + \frac{\sigma^2}{A^2}\right)^{-1} y$$

where y is equal to the matched filter outputs.

$$y = S^H S A b + n$$

These detectors are computationally simple but their performance suffers when the loading is high or when the correlation structure of the users is unfavorable.

Fortunately, low complexity detectors can still detect some of the users in an overloaded environment. Users who have favorable correlation structures, or higher powers will often times be detected using a lower complexity linear MUD. This allows the user to optimize the MUD performance by implementing a hybrid MUD structure as described herein in the turbo MUD.

Figure 2:
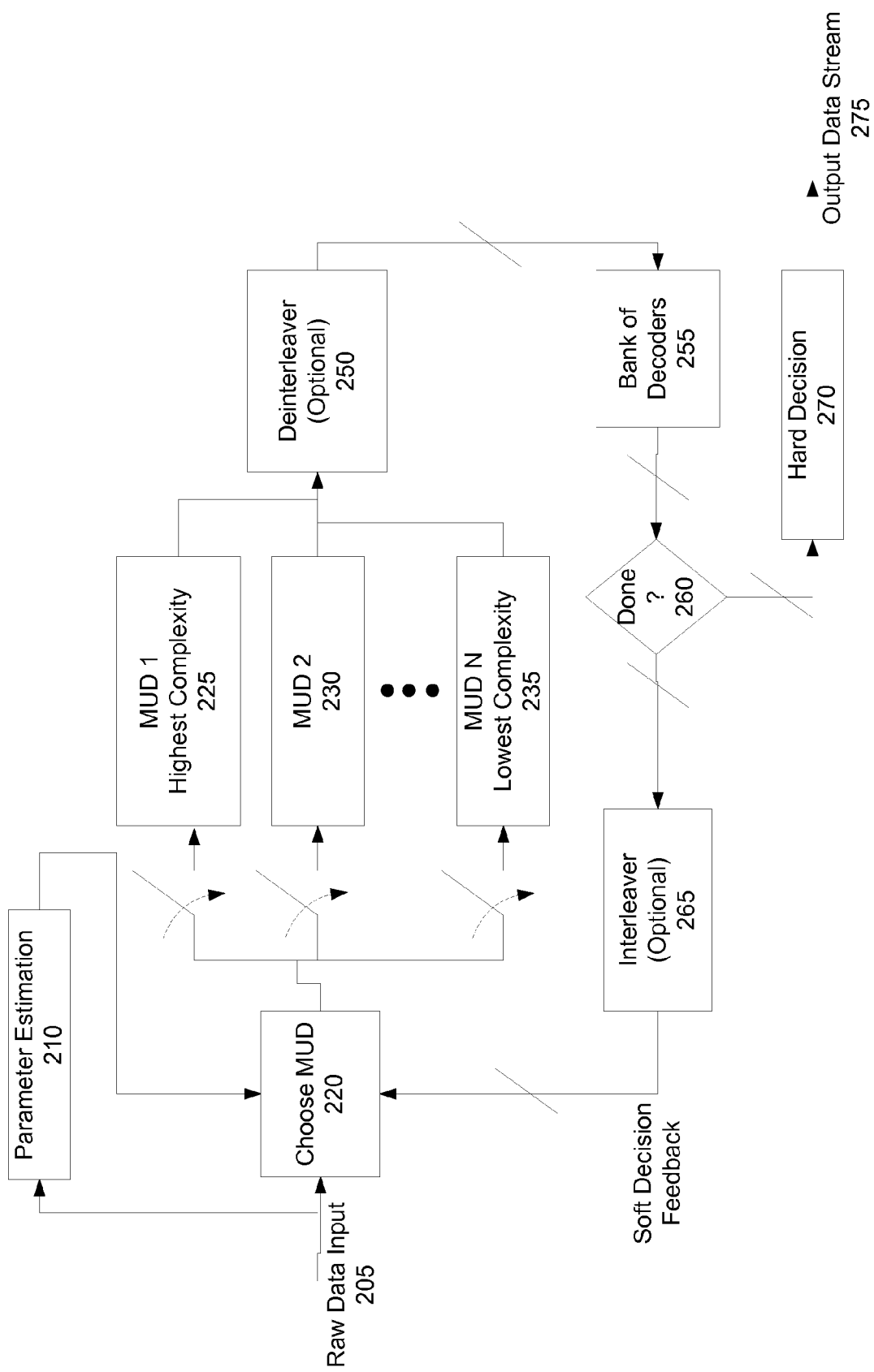
FIG. 2 is a block diagrammatic perspective according to one embodiment of a hybrid MUD that selects the MUD based on certain metrics.

Referring to FIG. 2, which shows one embodiment the present invention which incorporates a decision block to choose the MUD based on some metric. In basic terms, the hybrid MUD system of the present invention optimizes the MUD algorithms for a balance between computational complexity and performance. The turbo MUD performs successive interference cancellation in an iterative loop by combining a detector with a decoder that feeds back symbol estimates as well as probability of error estimates for each symbol. There are some MUD systems that employ a fixed approach to the turbo MUD processing such as having a high complexity MUD on the first iteration and then lower complexity MUD processing for subsequent iterations. However, the present invention provides for selecting the MUD at each iteration, or selecting the MUD within each bit window, based on certain criteria.

A brief description according to one embodiment is as follows. The raw data input 205 is fed to the parameter estimator 210 and also to a MUD decision unit 220. The MUD algorithms 225, 230, 235 within the turbo MUD can be structured for hard or soft output as well as hard or soft input processing, and it is well within the scope of the present invention to utilize any combinations thereof.

The raw data is processed by the MUD algorithm and outputs a soft or hard output. The soft output is an estimate of each transmitted symbol corresponding to each active user/channel. The stream of symbols, likely corrupted by errors, are passed to the bank of error correction decoders 255, one for each user/channel, which is capable of outputting either a corrected symbol stream for each user or a real number corresponding to the likelihood that each symbol is some specific value.

The MUD 225, 230, 235 assumes knowledge of various parameters such as relative received timing offsets, carrier phase, frequency offsets, received amplitudes, and channel structure for each of the interfering signals present in the received signal. The chosen MUD 225, 230, 235 outputs, for each user, a bit (or symbol) stream or a stream of soft values corresponding to the probability that a certain bit or symbol was sent by each user. The chosen MUD 225, 230, 235 is typically coupled to the parameter estimation unit 210 for obtaining information on the received signals, especially for the highest complexity MUD 225. An optional deinterleaver 250 is employed for transmission received in an interleaved format, such as CDMA. These symbol streams are sent to a bank of error correcting decoders 255, which can be optionally interleaved 265 before being passed back to the MUD decision unit 220 that selects the next MUD 225, 230, 235.

As indicated, the MUD decision unit 220 that selects from among at least one MUD 225, 230, 235 represents one of the inventive aspects of the present invention. There are many different ways that the decision can be made. The following list and descriptions are examples of possible decision metrics and are not to be considered an inclusive list or limitation to the invention. A simple way to make the decision on which MUD to use is based on the number of symbols that are being detected in a specific MUD window. A threshold can be set for every MUD technique and when the number of symbols falls below a given MUD technique's threshold it is used for demodulation. As turbo iterations progress the thresholds can change in order to allow remaining symbols that have not been removed in the Turbo iteration to go towards more complex MUD techniques. The reason for this is that the initial low complexity MUD techniques will be able to process a certain amount of symbols, while the symbols that the low complexity MUD cannot demodulate correctly will be sent to higher complexity MUDs as the process continues. However, for this further processing the overall number of symbols has been reduced by the low complexity MUD so the complexity of the higher complexity MUD is reduced as well.

Another technique for making the decision is to look at the correlation matrix between the users and comparing each diagonal term to the sum of the off diagonal correlation terms. If the ratio for a certain number of users is greater than a certain threshold then a lower complexity MUD can be used. If the ratio is below that threshold then a higher complexity MUD can be used. If more than two types of MUD are used, then multiple thresholds can be set for each MUD.

The decision can be made by calculating the expected bit error rate (BER) of each user based on all the lower complexity MUD techniques. If any of the users have an expected BER that is acceptable, or above a threshold, for any of the lower complexity MUD techniques, then use the lowest complexity MUD possible that meets that criteria. As users are removed through the turbo iteration the expected BER of the remaining users changes. If none of the users in a specific window have an expected BER below the threshold for any of the lower complexity MUD techniques then the highest complexity MUD technique should be used.

The decision can be made by taking the eigendecomposition of the correlation matrix and looking at all the eigenvalues that are above the noise floor. If the first N eigenvalues are very close to one another and the eigenvectors associated with those eigenvalues all have the same N entries terms then use a lower complexity MUD. If there are any other regions of the eigenvalues that are basically equal and the eigenvalues have the same dominant terms or if there is any one eigenvector that has a dominant term and its eigenvector is above the noise floor then use a lower complexity MUD. If the eigenvalues and eigenvectors of the correlation matrix do not have these characteristics then use the highest complexity MUD.

The decision can be made by calculating the signal to interference plus noise ratio (SINR) for each symbol. If the SINR for any symbols is above a threshold set for a specific lower complexity MUD technique then use that technique. If none of the SINR values are above any of the lower complexity MUD thresholds then use the highest complexity MUD.

The decision can be made by calculating the expected SINR value for each symbol after filtering with one of the lower complexity MUDs. If the SINR is above a threshold set for a specific lower complexity MUD technique then use that technique. If none of the post filtering SINR values are above any of the lower complexity MUD thresholds then use the highest complexity MUD.

Inside the turbo loop, a decision is made by the MUD decision unit 220 as to which MUD decoder to use based on certain criteria. The criteria can include such aspects as computational complexity, the number of bits to detect, expected BER of each detector for all users, and correlation structure. There can be a plurality of MUD units available for selection. The MUD decision unit 220 in this example decides between lower complexity linear mud 235, a medium complexity MUD 230 and a high complexity MUD 225.

In a turbo MUD system, decoding and confidence information is passed between the selected MUD 225, 230, 235 and decoder 255. Maximum a posteriori (MAP) decoders (or approximations of MAP decoders) can be used for both the MUD and single-user (SU) decoders, so that soft output information is available if desired.

According to one embodiment, the system achieves optimal balance by using the low complexity algorithm 235 when there are a lot of bits to decode or there are certain users which have a low probability of error with the linear detector, and by using a high complexity algorithm 225 when there are very few users to detect, or the correlation structure of the remaining users implies that a linear MUD will not be able to successfully correctly detect any of the users at a required BER.

The MUD decision unit 220 according to one embodiment detects as many users as possible with a low complexity MUD 235 such as the algorithm. The low complexity MUD 235 provides symbol estimates and probabilities of error for each symbol and decisions which are then subtracted off the signal. As the MUD progresses through the turbo loops, it reaches a point where the correlation structure of the remaining users are closer and the low complexity MUD 235 will no longer be able to satisfactorily detect the users in certain windows. At this point, the computational complexity has been reduced by the low complexity MUD 235 by stripping bits off of the received sequence. This allows the higher complexity MUD 225 such as the ML detector or M-algorithm to perform much more efficiently on the remaining symbols.

For example, decision logic may be based on BER calculations for each of the MUDs, the correlation structure, and number of bits to decode. By way of example, the number of bits remaining to decode may be used as the decision metric. In this implementation a threshold is set and compared to the number of bits to detect in each bit window. This number varies from window to window because changing correlation structures mean that a different amount of bits might be subtracted off the sequence for each window. Also users could be turning on or off during the sequence which would change the amount of bits per window in the initial turbo iteration. If the number of bits is above the threshold, a low complexity MUD 235 is used, if the number of bits is below the threshold a higher complexity MUD 225 is used. If the number of users left to decode is equal to 1 then a very low complexity detector such as a matched filter can be used (assuming no intersymbol-interference). For each iteration through the turbo MUD, the threshold can be increased so that more users can go to the high complexity MUD 225 in the later iterations.

Referring again to FIG. 2, in one embodiment, decoders 255 provides a soft outputs in the form of a stream of values corresponding to the probability that a certain bit or symbol was transmitted within each interfering user's signal present in the received signal. The soft data streams are passed to the chosen MUD 225, 230, 235 and the soft bit (or symbol) decisions are passed the optional deinterleaver 250 and then to a bank of error correction decoders 235. The interleaver 265 and de-interleaver 250 are used with interleaved transmissions, such as CDMA. Decoders 235 outputs soft values associated with the soft inputs, one stream of outputs for each interfering user present in the received signal. If not done 260, the time-shuffled conditional probabilities are input back to the decision unit 220 for iterative processing.

These soft outputs are passed back to the MUD decision unit 220 that selects the MUD 225, 230, 235 based upon the metrics for the remaining symbol decisions in the window. The MUD processing continues with the chosen MUD 225, 230, 235 and deinterleaved by the optional deinterleaver 250 that produces an improved stream of soft bit (or symbol) decisions that are then fed into the decoder 255 for another iteration of improvement. The information between the chosen MUD 225, 230, 235 and the decoders 255 repeats in subsequent iterations until an asymptote is reached, or the desired performance level is attained.

The number of iterations for processing in the turbo MUD loop can be set to a fixed counter or by checking if there were significant changes to the data from the last iteration. For example, once the data is no longer being altered or reaches a certain iteration counter limit, the data from the decoder 255 can be output as final estimates 270 of what the user sent.

When the desired quality of detection is reached (or a fixed number of iterations), and the processing is done 260, the soft output of decoder 255 is passed to the hard decision unit 270 for processing the hard decisions. The final stream of bits or symbols is output 275, one stream for each user present in the interfering signal. Operation can then commence for the next block of data, repeating the process described herein.

Interleaver 265 and de-interleaver 250 are optional elements used when interleaving is present in the transmitted communications. When the transmitter employs interleaving it changes the presentation of the values but not the values themselves. When interleaving is present in the transmitter, a transmitter interleaver unit (not shown) performs interleaving, and therefore requires the deinterleaver units 250 and interleaver units 265 on the reception end. Thus, in one embodiment, the system provides hard decisions with the MUD 225, 230, 235 and bank of decoders 255 for a reduced multi-access interference multiuser detector and hard decision error correction decoder.

According to one embodiment of the invention, the first iteration through the MUD is performed using the lower complexity MUD 235 such as a simple matched filter. Match filters are typically used if there are very few users, but even in situations with multiple users, the match filter can strip off some users. The complexity of the MUD processing depends upon the number of users, thus stripping off even a few users by using the low complexity MUD will allow the higher complexity MUD to be faster and more efficient. Thus, higher complexity MUD 225 can be used for the highly correlated signals that require the higher complexity processing.

The higher complexity MUD 225 can use better performing algorithms such as M-algorithm, T-algorithm, FANO or reduced state Viterbi. Iterations of the Turbo-MUD with the lower complexity MUD algorithms allow the present invention to operate in real-time and with lower complexity computational processing.

In one embodiment, the low complexity MUD 235 is any low complexity soft decision input soft decision output multiuser detector known in the art. Furthermore, the turbo MUD section comprising the low-complexity MUD 235, optional deinterleaver 250, bank of decoders 255, optional interleaver 265, decision block 260, and hard decision block 270 could be replaced with the low-complexity iterative MUD such as described in the incorporated patent applications, or the linear-based soft decision MUD known in the art and described in Chan and Wornell, 'A Class of Asymptotically Optimum Iterated-Decision Multiuser Detectors', or Wang and Poor, 'Iterative (Turbo) Soft Interference Cancellation and Decoding for Coded CDMA', IEEE Trans. on Comms, July 1999, or Moher, "An iterative multiuser decoder for near capacity communication," IEEE Trans. on Comms., v46, n7, July 1998.

For illustrative purposes, MUD can be considered as a tree pruning algorithm, wherein the tree is made up of nodes and branches. Each branch has a weight or metric, and a complete path is a sequence of nodes connected by branches between the root of the tree and its branches. The weight of each path is the sum of the branch metrics in a complete path. The goal of a tree searching algorithm is to try to find the complete path through a tree with the lowest metric.

It should be apparent to those skilled in the art that any tree pruned search such as Fano algorithm, M-algorithm, T-algorithm or reduced state Viterbi can be used as the MUD decoders in the Turbo-MUD processing. The illustration and description of the M-algorithm is not a limitation to the invention and is merely one way to do a sub-optimal search that prunes some decisions without doing every possible search combination such as the maximum likelihood (ML).

The M-algorithm, known in the art, can be used as the high complexity MUD. In certain applications, the M-algorithm uses a decision tree approach that defers decisions until more evidence is accumulated, and it is a generalization that encompasses the jointly optimal maximum likelihood detector as well as the simpler decision feedback detector. The result is a hypothesis pruning procedure that performs a decision tree search by limiting the number of hypotheses extended to the next stage of the decision tree. The structure of the decision tree is typically determined by the filter bank of the front end. The decision feedback techniques order the symbol hypotheses according to parameters such as the received power, SNR based, likelihood based, etc. . . . . Decisions are made sequentially on each symbol hypothesis and each decision is fed back to subtract the corresponding interference from the received data stream. The metric corresponding to a particular user's bit hypothesis at a stage in the decision tree consists of the Euclidean distance between the output of the one of the whitening filters and the hypothesized mean signal energy based on the bit hypothesis for the user in question and the mean signal energy corresponding to the hypotheses selected for users previously tested. In addition, this metric includes the accumulation of metrics corresponding to previous decisions. The output of symbol hypothesis testing is constrained estimates of the symbols for all users in the symbol period of interest. Various efficient decision tree search strategies can be employed in symbol-hypothesis testing. For example, the M-algorithm is one such approach that restricts the number of hypotheses at each stage to a fixed number. The T-algorithm is similar in nature to the M-algorithm however it restricts the number of hypotheses by comparing the accrued metric to a threshold. Extensions of this approach to other efficient approaches to decision tree searches are within the scope of the invention.

Figure 3:
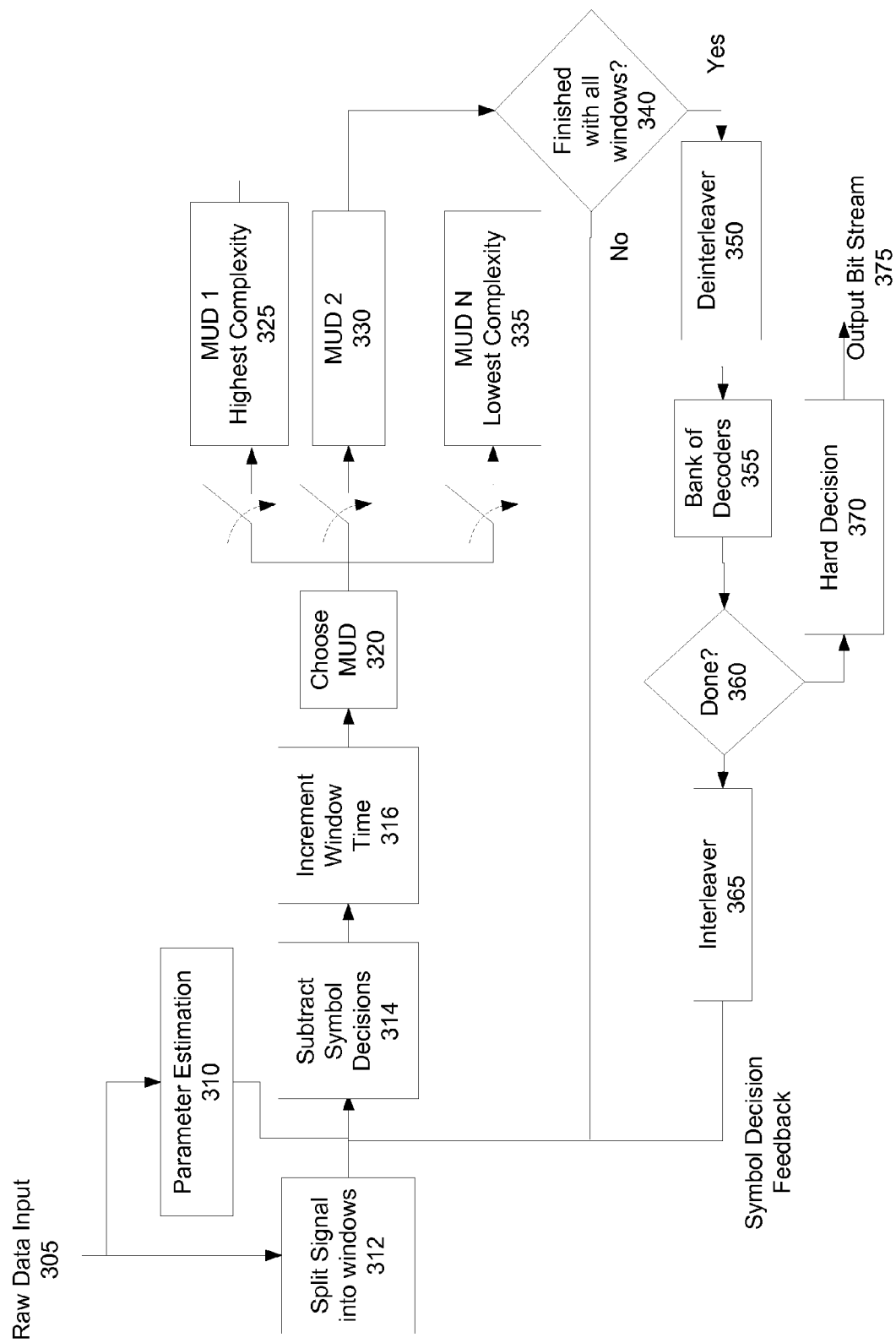
FIG. 3 is a block diagrammatic perspective of a hybrid MUD in accordance with one embodiment of the present invention.

FIG. 3 shows another embodiment the present invention that further includes an option for an overloaded front end unit 328 in cooperation with the high complexity MUD 325.

The received, downconverted, digitized, raw input signal 305 is coupled to the parameter estimator 310 and the signal is also split into windows 312. The received signal is split into windows where the window size is determined by the extent in time of the intersymbol interference for a specific users and the cochannel interference between users. If the length of the channel is small then this will typically be around 3 symbols in length. If the length of the channel is longer then the length of the window could increase. The size of the window is typically determined initially by the parameter estimator as it has apriori information about the signals. The window size chosen will have an effect on the thresholds that are set for the MUD decision metric. These thresholds will be adjusted to compensate for a higher or lower numbers of bits in the window based on the window size.

Further details concerning windowing are described in the commonly owned U.S. patent application Ser. No. 10/486, 871 entitled "Windowed Multiuser Detection" filed Feb. 11, 2004.

By way of illustration, assuming User 1 to User k, wherein the multiple users have various delays with respect to each other, the blocks of data for each user arrive at the receiver with an offset with respect to each other and are thus asynchronous. Each block of data consists of a series of transmitted symbols that can be of any length. Turbo MUD processing is accomplished by selecting a frame of data, which typically encompasses at least a full block of data for each user, wherein the frame of data is processed by the MUD and passed to the decoders. MUD processing requires that the processing window includes frame 'i' for user 1 and frame 'i' for user 2, etc. . . . . Therefore the processing window is at least as wide as any single block of data. The step is repeated for a number of iterations for each user before proceeding to the next frame of data, including blocks 'i+1'.

On a first iteration, there are typically no symbol decisions except if training data is present and if there is decision feedback within each iteration, however on subsequent iterations, certain symbols may have been decided and known and these can be subtracted from the block of data 314.

The next step is to increment the window time 316. Complete blocks of data are typically decoded one at a time, so the MUD processing is performed for all of the symbols for a given window or frame before decoding the results and then proceeding to the next window.

Based upon the decision logic, the MUD is chosen 320 for the particular window of data. As described herein, there are multiple MUD algorithms to choose from and the optimal MUD is selected based upon certain metrics. As noted, the high complexity MUD 325 is coupled to the low complexity MUD so that an independent decision is made about which MUD technique to use for every window.

In one embodiment, one of the options includes a whitening filter such as a whitening matched filter or whitened-M algorithm pre-filter. The whitening filter may use the information from the parameter estimation unit 310 to create a filter that will 'spread' or 'warp' the raw input signal so that it is easier to distinguish between the various users' signals that make up the received raw input signal. Supersaturated or overloaded conditions occur when the number of users exceeds the number of dimensions, wherein the number of dimensions is determined by the physical parameters of the system. The filter sends the filtered signal data to the high complexity MUD 325 such as an M-algorithm pruned tree search.

An example of the filtering designed to handle overloaded conditions is described in pending U.S. application Ser. No. 10/423,655, entitled "Deferred Decorrelating Decision-Feedback Detector For Supersaturated Communications".

The system checks whether the window is completed 340 and if not contemplated the processing continues until the block of data in the window is completed. Once completed, the turbo MUD processing continues with the deinterleaver 350 and the bank of decoders 355. If the processing is completed 360 based upon some criteria, the hard decisions are calculated and the output bit stream 375 is transmitted for subsequent processing. If the processing is not done 360, the date is subject to re-interleave 365 and back through the loop commencing with subtracting symbol decisions 314.

Figure 4:
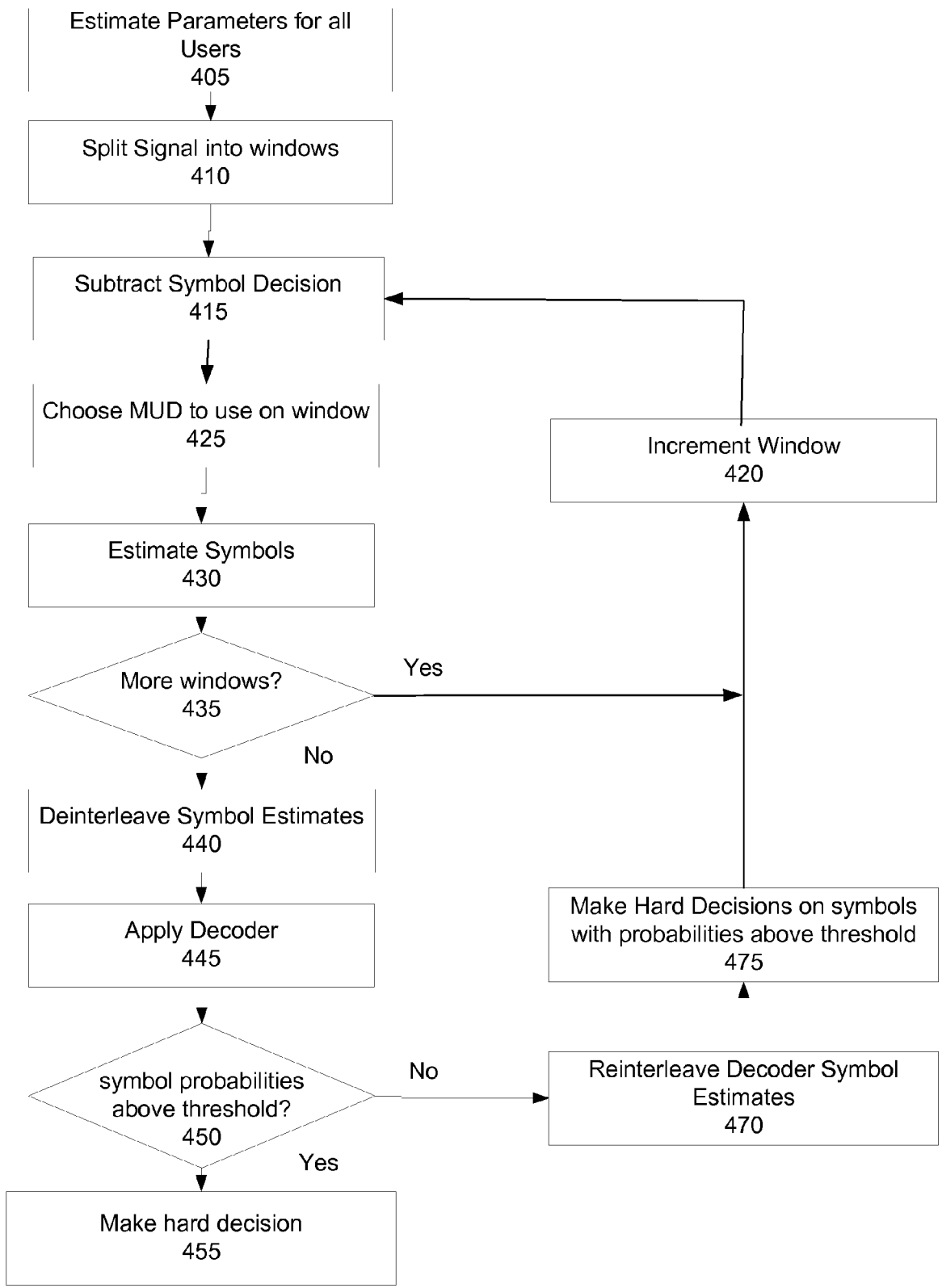
FIG. 4 is a flow chart showing processing steps according to one embodiment.

Referring to FIG. 4, a process flow is illustrated with respect to one embodiment. A raw data stream, potentially complex, is received from some a source. For the case of Code Division Multiple Access (CDMA) communications schemes, the data stream is sampled by some multiple of the chip rate. For TDMA communication schemes, the data stream is sampled at some multiple of the symbol rate. The data represents a vector of data, transferred at some rate (e.g., the symbol rate). This data is input and processed by a parameter estimator, wherein parameter estimation is known to those skilled in the art. The purpose of the parameter estimation processing is to estimate timing, signal amplitudes, phases, polarization, frequency offset, and/or identification of transmission channels. Estimate parameters for all users are calculated 405 and passed to any filters and to the high complexity and low complexity MUD sections.

The received signals are split into a plurality of windows 410, wherein the windows are subsets of the total received signals. The windows according to this embodiment are split into length of $\tau$. The variable $\tau$ is determined by the length of the intersymbol interference and the length of the cochannel interference and possibly the channel length for a specific symbol time. Typically, $\tau$ is chosen such that it is larger than the intersymbol and cochannel interference and such that one to several symbols that are part of the cochannel and intersymbol interference are being estimated at the same time as the symbol of interest.

Any previous symbol decisions are then subtracted from the received signal 415. At this point, based on some metric, the MUD for this window is selected 425. The MUD processing is performed and symbol estimates are obtained from the selected MUD 430.

If there are more windows to process 435, the window is then incremented by τ 420, and the process iterates commencing with the step of subtracting the symbol decision from the received signal.

Once all the windows have been processed, the MUD symbol estimates are deinterleaved 440. A decoder is then applied to the symbol estimates for each user 445. If all the symbols are above the threshold 450, then the hard decisions are made for all the decoded bit estimates 455.

If not all the symbols are above the threshold 450 the decoded symbol estimates are reinterleaved 470 and hard decisions are made on symbols with probabilities above the threshold 475. The processing then repeats the steps commencing with subtracting the symbol decision from the received signal 415.

Figure 5A:
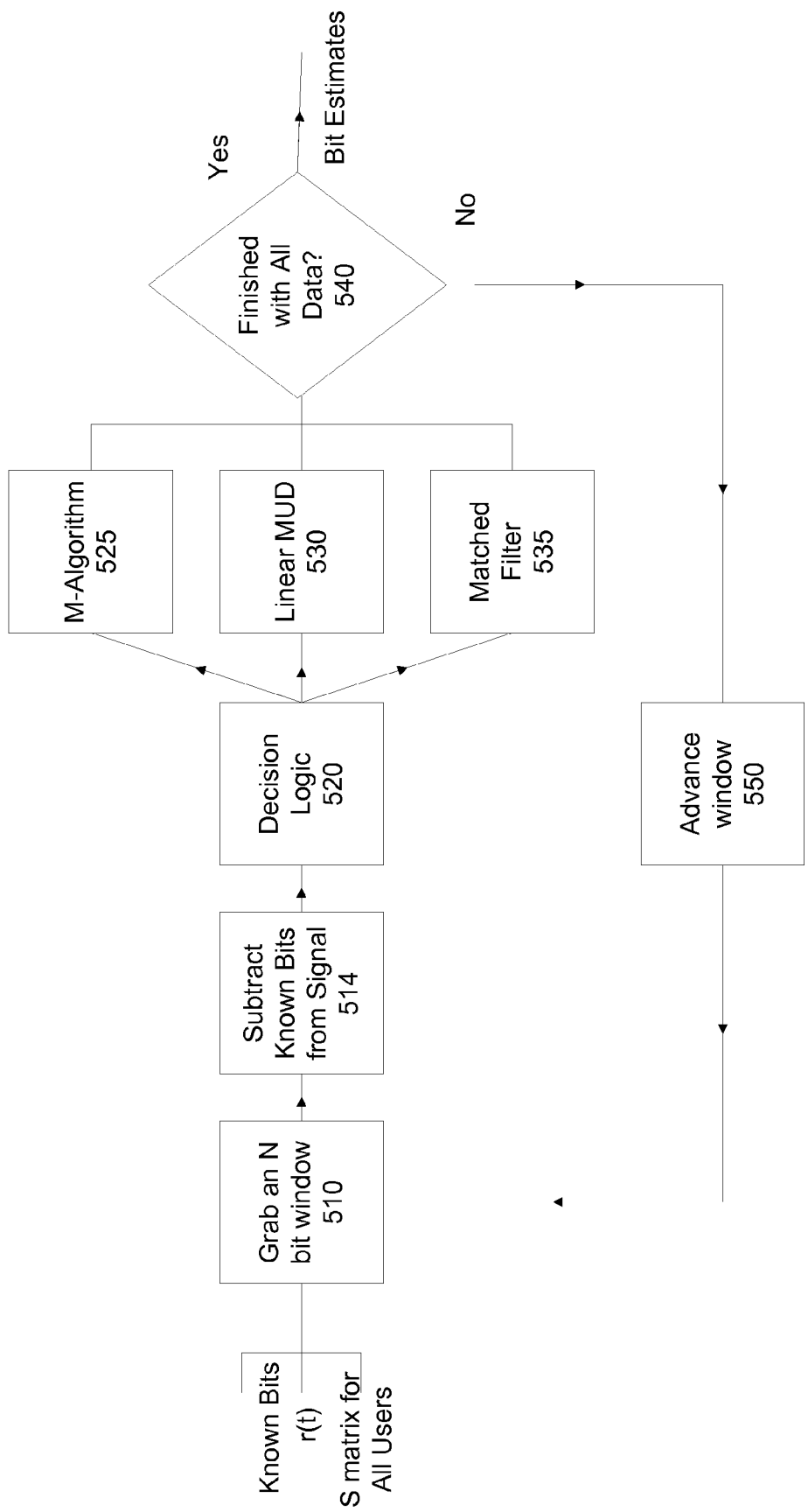
FIG. 5a illustrates a block diagram system of the present invention in accordance with one embodiment.

Referring to FIG. 5a, one embodiment is depicted for the iterative processing of the turbo MUD loop wherein the input of know bits r(t) is represented as an S matrix for all users. This data is divided into an N bit window 510, for example, 5 bits, and any known bits are subtracted from the signal 514 thereby decreasing the number of bits and simplifying the decision tree processing for the MUD.

The decision logic unit 520 selects which MUD to use based on certain metrics as detailed herein. By way of example there are three MUDs depicted which includes a high complexity M-Algorithm algorithm 525, a linear MUD 530, and a low complexity "MUD" being a matched filter 535. Note that for purposes herein, a matched filter is considered a MUD type.

Figure 5B:
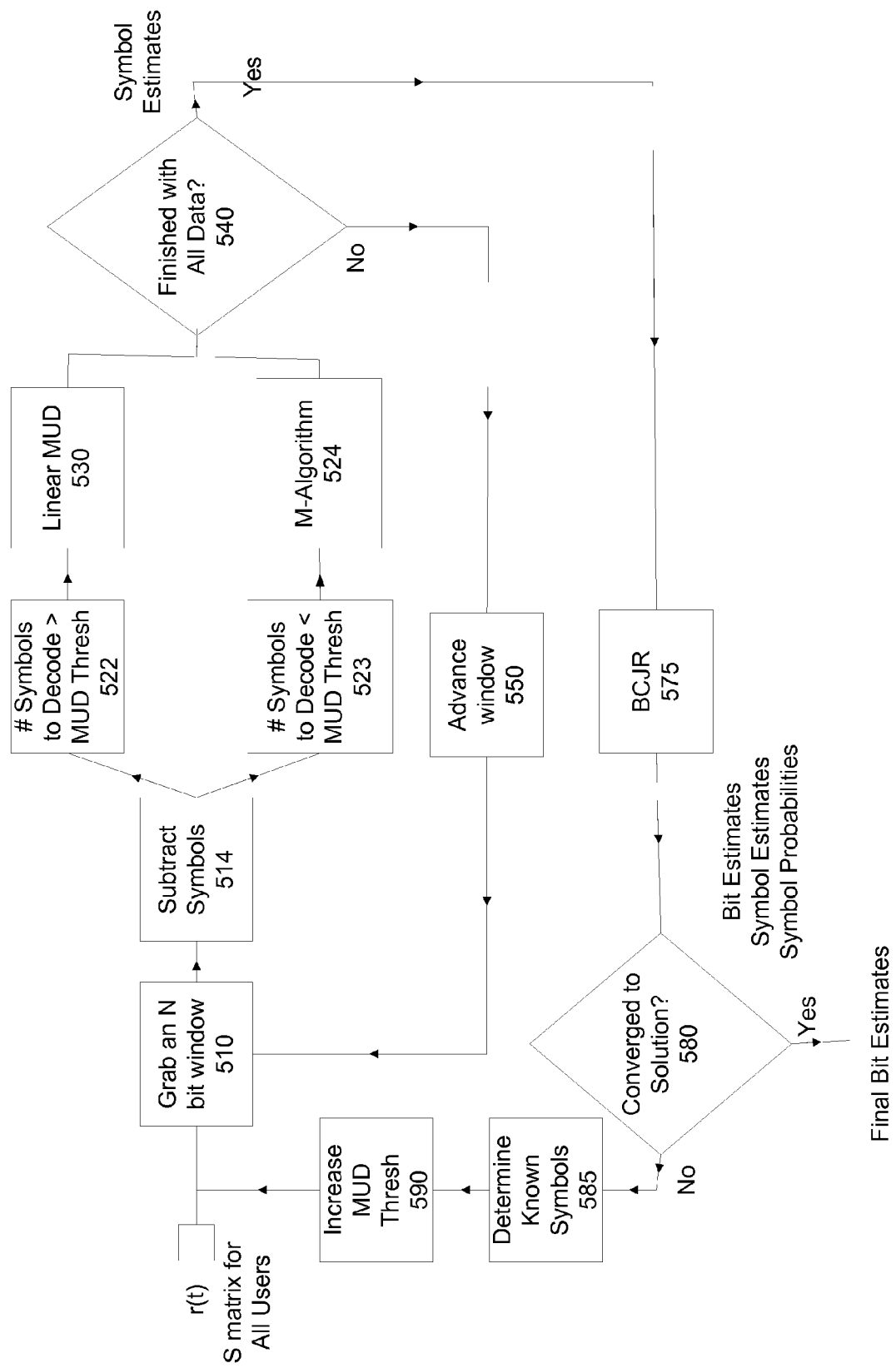
FIG. 5b illustrates a block diagram system of the present invention in accordance with another embodiment.

Referring to FIG. 5b, a further embodiment is illustrated wherein the number of bits remaining to decode is used as the decision metric. The input data r(t) is subject to windowing 510 and known symbols are subtracted 514. The number of simultaneous bits that have to be decoded in a MUD window is counted. In this implementation a threshold is set and compared to the number of bits to detect in each bit window. One way of determining the threshold is to determine on average how many simultaneous bits each MUD technique can correctly estimate at each iteration. This number varies from window to window because changing correlation structures mean that a different amount of bits might be subtracted off the sequence for each window. If the number of bits is above the threshold 522 a low complexity MUD 530 such as a linear MUD or a matched filter is used, if the number of bits is below the threshold 523 a high complexity MUD 524 such as an M-Algorithm, sphere decoder or ML is used. As the number of turbo iterations increases, the threshold value increases, allowing the low complexity MUD to strip off users using the turbo loop. The harder bits are then left for the higher complexity MUD that gives better results. The high complexity MUD uses the remaining data already processed by the lower complexity MUD algorithms and thus has a smaller number of undetermined user symbol streams.

A further embodiment includes a matched filter as the low complexity MUD, wherein if the number of users left to decode is equal to 1, then the matched filter is used (assuming no intersymbol-interference). The matched filter can also be used when there are more users if the decision logic states that it will be able to correctly estimate one or several of the symbols within the window.

Referring again to FIG. 5b, according to one embodiment, the system initially detects as many users as possible with a linear MUD 530.

If the data is not yet fully processed 540, the window is advanced 550 and the next N bit window is processed 510. The known symbols are subtracted 514 and processing continues along with the MUD decision 522, 523 and turbo MUD processing.

If all the received data is finished 540, the BCJR 575 provides symbol estimates and probabilities of error for each symbol and decisions. If the bit estimates have reached a satisfactory level and converged to a solution 580, the final bit estimates are transmitted along for subsequent processing. If further iterations are required, the know symbols are determined 585 and the MUD threshold can be increased 590. The next N symbol window of data is retrieved 510 and known symbols are subtracted 514.

In a non-iterative MUD implementation, the processing would only occur once in a single MUD loop, however this would depend upon the received data and the desired end result. In other iterative embodiments, a fixed variable such as three or four iterations can be used as the total number of iterations performed, wherein a simple counter will maintain track of iterations and stop the processing accordingly. Alternatively, there can be a buffer to store the last iteration value and when the number of changes as compared from a last iteration to the present iteration reaches a satisfactory level the iterations are stopped.

Figure 5C:
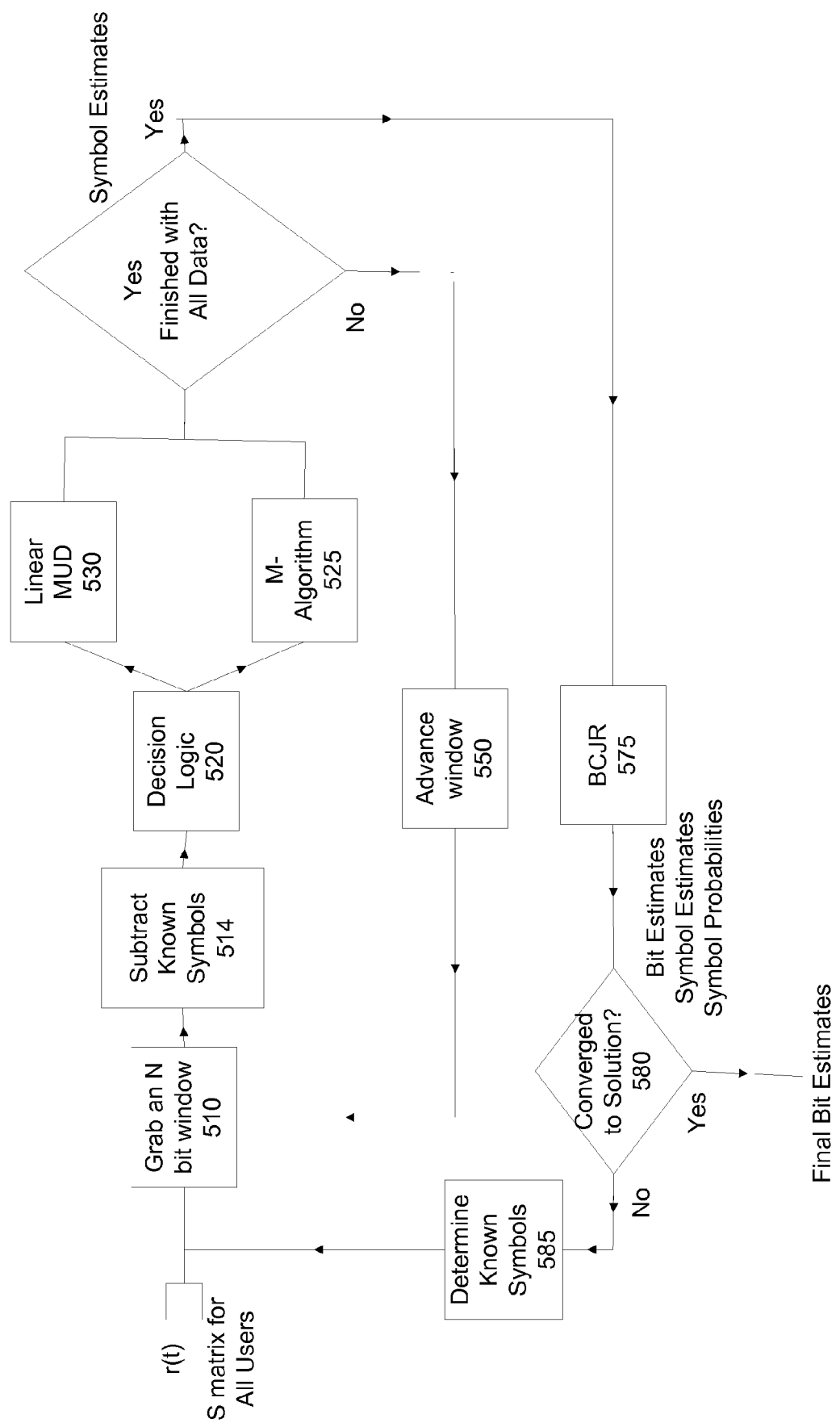
FIG. 5c illustrates a block diagram system of the present invention in accordance with a further embodiment.

Referring to FIG. 5c, a further embodiment is illustrated somewhat similar to that of FIG. 5b, but with the differences noted herein. In this embodiment, the decision logic unit 520 determines whether the high or low complexity MUD is used for processing the window of data.

There are a number of methods for making the MUD decision 520, including having the decision based on the number of users (symbols) in a MUD window, the correlation between users, the SINR of each of the users relative to each other, the expected BER of each user for each of the MUD detectors, the SINR of each user after filtering with a specific linear MUD. This includes combinations of these decision logic methods that could trade off complexity and probability of error. For example, the MUD decision can be based on correlation between users on the first iteration and subsequent iterations of the turbo MUD can be based on the number of symbols to decode.

Another embodiment uses the structure of the eigenvalues as the decision logic to determine which MUD to use to process users. For example, the expected BER across all users is examined for the simplest MUD. If one or more users have an expected BER below a certain threshold, then that MUD is selected, otherwise the expected BER across all users is processed for the next simplest MUD. The processing continues until the complex MUD is reached and the remaining highly correlated signals are processed.

As the MUD progresses through the turbo loops, it reaches a point where the correlation structure of the remaining users is such that a linear MUD will no longer be able to detect any of the users in certain windows. At this stage however, the computational complexity has been reduced by the linear MUD by stripping bits off of the received sequence thereby allowing the ML detector or m-algorithm to perform much more efficiently.

In this particular embodiment, the MUD threshold is not increased as in FIG. 5b, but remains the same for all iterations of the turbo MUD.

It is readily apparent that the hybrid TurboMUD technique is used in a variety of applications and with varied methods for implementing the system, and is therefore not limited to the embodiments presented herein. Variations and modifications may be made without departing from the scope of the present invention, and the reference to processing received signals is applicable to signals received from numerous implementations and not merely a wireless receiver. The hybrid Turbo-MUD technique described herein can be incorporated within numerous other MUD and TurboMUD implementations disclosed in the art and in the related pending applications.

In operation, the data is processed by the parameter estimator and then decision logic chooses the selected MUD for each window based on some metric. A window size selection is determined and the system creates a window of data. The window size can be relatively small, such as 5 bits. The processing continues and goes window by window, and for each window chooses a decoder based on the metric. Every single time it goes through the MUD on a window a decision is made.

For the lowest complexity MUD a matched filter can be used. Single user and even small number of users can employ a matched filter. And even for large number of users the matched filter can strip off certain users. Using the lower complexity MUD thus lowers the complexity and reserves the higher complexity MUD for the data that is more difficult (higher correlation) and not discernable by the lower complexity MUD. High complexity depends on number of users so by lowering the number of users reduces the complexity.

Commonly owned patent applications describing varied forms of multi-user systems that can employ the present invention are hereby incorporated by reference for all purposes and include U.S. Pat. No. 6,839,390, titled "Voting System for Improving the Performance of Single-User Decoders within an Iterative Multi-User Detection System"; U.S. application Ser. No. 10/105,918, filed Mar. 25, 2002, titled "System for Decreasing Processing Time in an Iterative Multi-User Detector System"; U.S. application Ser. No. 10/423,655, filed Apr. 25, 2003, titled "Deferred Decorrelating Decision-Feedback Detector for Supersaturated Communications"; and U.S. Pat. No. 6,704,376 entitled "Power and Confidence Ordered Low Complexity Soft Turbomud with Voting System."

One example for multiuser detection is for wireless communication, wherein a number of users (1-K) generate signals that are sent by transmitters into free space. There is normally a noise component that is introduced from the environment of a random nature in the received signal. The various signals are received at antennas (1-p), wherein there is one signal for each polarization or spatially separated feed. The signals represent directly received signals, as well as multi-path signals from the same user, and interfering signals from other users. The plurality of signals from each antenna is processed in a RF front end unit. The front end unit downconverts the higher frequency signals into baseband signals for ease of processing. The baseband signals are also digitized by analog to digital converters (A/D). The front end cooperates with the parameter estimation unit to retrieve needed information for the signals such as relative received timing offsets, carrier phase, frequency offsets, received amplitudes, and multipath structure for each of the interfering signals present in the received signal.

The MUD element consists of functional blocks that process the digital data and extract the user symbol streams. The pre-processor converts the baseband digital data into the proper format for further processing according to the desired detection scheme and whitens it. The format is often one measurement per 'dimension' per symbol. An example of this processing is a bank of matched filters followed by a measurement whitening filter. The multi-user detection stage is detailed herein and cooperates with the error correction decoding (ECD) for iterations of the processing of the hybrid Turbo-Mud as detailed herein employing a high complexity MUD and decoder section and a low complexity MUD and decoder section.

The output of the MUD element can, optionally, be returned for a number of iterations in conjunction with the parameter estimation unit that uses the returns to improve the parameter estimates that are used to define the whitener and both the low and high complexity MUD processing. When the output K bit stream has reached a certain level of processing as described herein, the output signals are forward to the output stage (not shown). Alternatively the number of iterations can be used to fix the amount of processing.

Another application of the invention is to allow for multi-user detection for a variety of communications formats. The processing scheme of the present invention manipulates bits utilizing some apriori information so that the system has some knowledge of what the signals were supposed to have been had they been received individually and without interference or other impairments. One application which shows a non-CDMA environment is to the application involving GSM, which is a narrow band TDMA system. The user communicates over a timeslot and when the time slot is filled, another user has to wait until an open slot is available. The present invention allows reassignment of the timeslot so that signals from a second user can overlay with a first user. The only distinguishing characteristics, other than the fact that they are sending different symbol streams, would be phase, fine timing offsets, received polarization orientation, and power differences, and frequency offsets, that can be employed as described herein to differentiate user 1 from user 2. Another example relates to communications in airplanes, wherein there will be multiple users trying to communicate within a given bandwidth. The present scheme allows these multiple users to function within the same region by picking apart attributes that distinguish one user from another.

While the discussion herein illustrates wireless cellular communications, the present invention is applicable to wired cable systems and local area networks, read/write operations of a disc drive, satellite communications and any application that benefits from extracting digital information from among many multiple interfering signals.

While the operation of the subject system has been described in terms of a wireless communications network, it has application to any situation in which digitally encoded interfering signals exist. Thus, the subject system has application to cable networks in which multiple users are seeking to communicate with a head end system simultaneously. In another embodiment, the present system is incorporated into reading storage mediums, such as computer hard drives, and to separate signals from adjacent tracks when the read head overlies portions of adjacent tracks. With the increasing density of storage devices such as hard drives, memory cards, and various storing discs, there are significant commercial advantages and incentives to place more data on smaller spaces and being able to quickly and reliably extract the data. The processing schema of the present invention is easily tailored to such an application as the data from the compact tracks of the recorded medium from the storage devices resembles wireless data bits and requires processing to promptly access and retrieve the desired data. The MUD processing with respect to the storage devices refer to the plurality of signals received when the optical head picks up the signals of the adjacent tracks of the storage mediums. The tight spacing between the tracks creates a multiple user detection problem involving the processing of the desired track signal from the other received tracks.

A further application of the present invention is in a cable modem environment. The Cable Modem Termination System provides the head end interconnect for a plurality of individual cable modems for the transmission of data. In rough terms, the cable modem functions like a local area network (LAN). The cable modem itself combines an upstream modulator and a downstream demodulator. Most current networks are hybrid-fiber-coax networks using fiber for the main lines and coax cable connecting to the individual houses and cable modems. Inside the home, the cable modem can be connected to any of the various devices such as TV for cable television programs. It also provides Internet connectivity, interactive TV interface, smart appliance operation, and email access among other functions. The Cable Modem Termination System (CMTS) connects to the main grid that connects to a number of cable modems. The cable modems connect to a variety of devices, such as personal computer and televisions. The present invention allows the use of the data processing from the CMTS to each of a plurality of houses in a fashion similar to the base station deployment.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A hybrid Multi-User Detector System for processing received signals, comprising:
   a parameter estimator coupled to said received signals providing received data information;
   a multi-user detector decision unit coupled to said parameter estimator and said received signals;
   at least two multi-user detectors coupled to said parameter estimator and said multi-user detector decision unit, said multi-user detector decision unit using decision criteria to determine a selected multi-user detector, wherein said selected multi-user detector outputs a plurality of information streams, one stream corresponding to each of said received signals; and
   a bank of decoders coupled to said plurality of information streams, wherein said decoders output a plurality of improved information streams.

2. The System according to claim 1 wherein said plurality of improved information streams are fed back to said multi-user detector decision unit until a final condition is reached and said bank of decoders output a final data stream.

3. The System according to claim 1 wherein said design criteria is based upon at least one threshold selected from at least one of the group consisting of: number of symbols, correlation matrix between users, expected bit error rate, eigendecomposition of correlation matrix, signal to interference plus noise ratio, and expected SINR.

4. The System according to claim 3 wherein said threshold is dynamically changeable.

5. The System according to claim 1 wherein said at least two multiuser detectors are selected from the group consisting of: M-algorithm, sphere decoder, T-algorithm, FANO, reduced state Viterbi, Maximum Likelihood, matched filter, minimum mean squared error (MMSE), decorrelator, and combinations thereof.

6. The System according to claim 1, further comprising an interleaver unit and a deinterleaver unit coupled between said bank of decoders and said multi-user detectors.

7. The System according to claim 2, wherein said final condition is determined by one of a fixed number of iterations and an allowable performance level.

8. The System according to claim 1, further comprising a filter unit coupled to said received signals, wherein said filter unit is coupled to said multi-user detector decision unit.

9. The System according to claim 1, further comprising a hard decision unit coupled to said bank of decoders and producing a final data stream.

10. A hybrid receiver for processing a plurality of received signals, said receiver comprising:
    a parameter estimation unit coupled to said received signals, wherein said parameter estimation unit extracts received signal information;
    a multi-user detector decision unit coupled to said parameter estimator and said received signals, wherein said multi-user detector decision unit selects a multi-user detector based upon at least one threshold;
    a low complexity multi-user detector switchably coupled by said multi-user detector decision unit, wherein said low complexity multi-user detector outputs a plurality of low complexity processed information streams;
    a medium complexity multi-user detector switchably coupled by said multi-user detector decision unit, wherein said medium complexity multi-user detector outputs a plurality of medium complexity processed information streams;
    a high complexity multi-user detector switchably coupled by said multi-user detector decision unit, wherein said high complexity multi-user detector outputs a plurality of high complexity processed information streams; and
    a bank of decoders coupled to said plurality of low complexity processed information streams, said plurality of medium complexity processed information streams, and said plurality of high complexity processed information streams, wherein said decoders output a plurality of refined information streams.

11. The hybrid receiver according to claim 10, further comprising a front end section coupled to said received signals and to said received signal information which filters said received signals.

12. The hybrid receiver according to claim 10, wherein said plurality of refined information streams are fed back to said multi-user detector decision unit for iterative processing until a final condition is reached and said bank of error correction decoders output a final plurality of bit streams.

13. The hybrid receiver according to claim 10, wherein said multi-user detector decision unit makes a selection determined by design criteria based upon at least one threshold selected from at least one of the group consisting of: number of symbols, correlation matrix between users, expected bit error rate, eigendecomposition of correlation matrix, signal to interference plus noise ratio, and expected SINR.

14. The hybrid receiver according to claim 10, wherein said threshold is changeable.

15. The hybrid receiver according to claim 12, wherein said final condition is one of a fixed number of iterations and an allowable performance level.

16. The hybrid receiver according to claim 10, further comprising a hard decision unit coupled to said bank of decoders and producing a final data stream.

17. A method for processing signals from multiple users with raw digitized data, comprising:
    performing parameter estimation of said raw digitized data;
    grabbing a window of bits from said raw digitized data;
    subtracting any known bits from said window of bits;

selecting a multi-user detector;
estimating unknown bits from said window of bits using said multi-user detector;
incrementing to a next window of bits;
repeating said steps of subtracting, selecting, estimating and incrementing until there are no more windows and outputting a set of symbol estimates.

18. The method according to claim 17, wherein said multi-user detector is selectable from the group consisting of high complexity multi-user detectors, medium complexity multi-user detectors, low complexity multi-user detectors and matched filters.

19. The method according to claim 17, further comprising determining a size of said window by at least one of an intersymbol interference length, a channel length, and a cochannel interference length.

20. The method according to claim 17, further comprising checking said symbol estimates for a threshold condition;
outputting a final bit stream for each user if passing said threshold condition, and repeating said steps of subtracting, selecting, estimating and incrementing if failing said threshold condition.

* * * * *